United States Patent
Schmitz et al.

[19]

[11] Patent Number: 6,102,367
[45] Date of Patent: Aug. 15, 2000

[54] GAS TAP

[75] Inventors: Jean-Claude Schmitz, Heisdorf; Léon Kerger, Helmdange, both of Luxembourg

[73] Assignee: Luxembourg Patent Company, Luxembourg, Luxembourg

[21] Appl. No.: 09/012,151

[22] Filed: Jan. 22, 1998

[30] Foreign Application Priority Data

Jan. 31, 1997 [LU] Luxembourg ............................. 90017

[51] Int. Cl.⁷ .......................... F16K 31/50; F16K 17/40
[52] U.S. Cl. ...................... 251/265; 137/68.11; 251/214
[58] Field of Search ................... 137/67, 68.11, 137/68.14, 68.16, 272; 251/214, 264, 265, 273

[56] References Cited

U.S. PATENT DOCUMENTS

| | | | |
|---|---|---|---|
| 633,217 | 9/1899 | Qurin | 251/265 |
| 1,203,371 | 10/1916 | Lowe | 251/265 |
| 1,287,107 | 12/1918 | Robertson | 251/266 |
| 1,294,491 | 2/1919 | Lavigne | 251/265 |
| 1,523,953 | 1/1925 | Giesler | 251/265 |
| 1,642,412 | 9/1927 | Farnsworth | 251/265 |
| 2,171,078 | 8/1939 | Cline | 137/272 |
| 2,216,292 | 10/1940 | Evleth | 251/265 |
| 2,784,934 | 3/1957 | Paulius, Jr. et al. | 251/265 |
| 3,428,291 | 2/1969 | Callahan, Jr. et al. | 251/265 |
| 4,488,704 | 12/1984 | Wicker | 251/273 |
| 4,907,617 | 3/1990 | Whalen | 137/68.11 |
| 4,928,920 | 5/1990 | Feild | 251/265 |
| 5,144,973 | 9/1992 | Green et al. | 137/68.11 |
| 5,419,530 | 5/1995 | Kumar | 251/265 |
| 5,785,074 | 7/1998 | Kieper | 137/68.11 |

FOREIGN PATENT DOCUMENTS

| | | | |
|---|---|---|---|
| 532655 | 2/1922 | France | 251/265 |
| 1116952 | 3/1956 | France | 251/265 |
| 1206577 | 2/1960 | France | 251/265 |
| 656 995 | 2/1938 | Germany. | |
| 16 27 992 | 8/1951 | Germany. | |
| 834 041 | 8/1951 | Germany. | |
| 23 33 424 | 1/1975 | Germany. | |
| 87 13 518 | 11/1987 | Germany. | |
| 482784 | 7/1953 | Italy | 251/265 |
| 103281 | 3/1923 | Switzerland | 251/265 |

*Primary Examiner*—George L. Walton
*Attorney, Agent, or Firm*—Leydig, Voit & Mayer

[57] ABSTRACT

A gas tap comprising an external operating element and a connecting stem for transmitting the movement of the operating element to the opening and closure member which is arranged in such a way as to be held against the sealing seat under the effect of the pressure of the gas. To make opening against the pressure of the gas easier, the operating element comprises a cylindrical sleeve which has a first screw thread that makes the sleeve move axially when the operating element is turned and a second screw thread of opposite hand to the first screw thread and with different screw pitch so as to alter the effect brought about by the first screw thread.

14 Claims, 1 Drawing Sheet

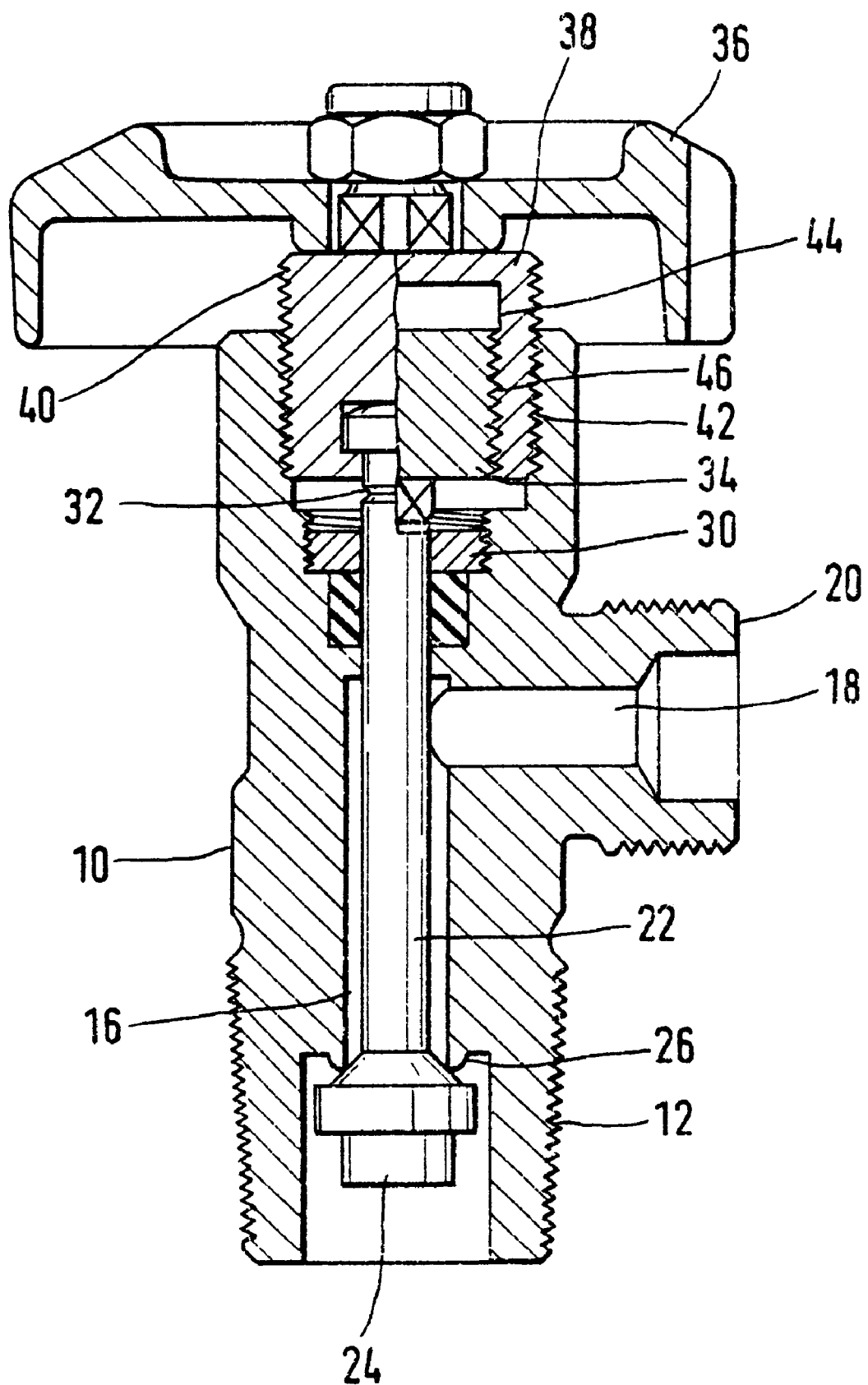

GAS TAP

FIELD OF THE INVENTION

The present invention relates to a gas tap comprising a body with an internal opening and closure member interacting with a sealing seat, an external operating element and a connecting stem for transmitting the movement of the operating element to the opening and closure member.

BACKGROUND OF THE INVENTION

The invention is more particularly targeted at taps which have to meet the strictest safety criteria and which need to be easily operable such as, for example, taps for gas bottles used in the hospital environment. For safety reasons, it is desirable for the closure member of these taps to be arranged in such a way that it is urged in the direction of closure by the pressure of the gas. This means, however, that in order to open the tap, it is necessary to overcome the force exerted by the pressure of the gas on the closure member. The force required to open the tap can thus become very high when the pressure of the gas in the bottle is high. Put another way, the ease of operation and the very strict safety rules are not always criteria that can be readily reconciled.

The purpose of the present invention is to provide a novel gas tap, especially for a high-pressure bottle, which is readily operable and which meets the strictest safety criteria.

SUMMARY OF THE INVENTION

In order to achieve this objective, the invention proposes a tap of the kind described hereinabove which is characterized in that the opening and closure member is arranged in such a way as to be held against the sealing seat under the effect of the pressure of the gas, in that the operating element comprises a cylindrical sleeve which has a first screw thread that makes the sleeve move axially when the operating element is turned and in that there is a second screw thread with a different screw pitch so as to alter the effect brought about by the first screw thread.

According to one advantageous embodiment, the cylindrical sleeve has an external screw thread interacting with a corresponding internal screw thread in the body of the tap and an internal screw thread interacting with a corresponding external screw thread of a cylindrical piston to which the upper part of the connecting stem is attached, the internal screw thread and the external screw thread of the cylindrical sleeve having different pitches.

The pitch of the internal screw thread is preferably smaller than that of the external screw thread.

According to another aspect of the invention, the tap body has, at the base of the said corresponding internal screw thread, an annular shoulder with a seal between the body and the base of the said cylindrical sleeve when the latter is in the wide-open position.

The connecting stem passes, in its upper part, through a gland and advantageously has, above this, a reduced cross-section that forms a safety rupture point.

The lower part of the connecting stem passes through a gas outlet passage and its lower end carries the closure member which interacts with an annular seat surrounding the lower end of the said outlet passage.

BRIEF DESCRIPTION OF THE DRAWINGS

Other features and characteristics of the invention will emerge from the detailed description of one advantageous embodiment given hereinbelow by way of illustration with reference to the appended FIGURE which depicts a vertical section through a tap according to the present invention.

DETAILED DESCRIPTION OF THE PREFERRED EMBODIMENT

The tap depicted in the FIGURE comprises a body 10, for example made of metal, the lower part of which has a screw thread 12 allowing it to be screwed into a gas bottle, not depicted. The body 10 has an axial passage 16 passing through it, this passage communicating with a radial outlet passage 18 passing through a connector 20 to which a user circuit, not shown, can be connected.

The axial passage 16 has passing through it a stem 22, the lower end of which carries a closure member 24 which interacts with a seat 26 surrounding the lower end of the passage 16. Given that the seat 26 is located above the closure member 24, the latter is urged onto the seat 26 by the pressure of the gas. Thus, when, by accident, the tap breaks above the bottle, no gas can leak.

The upper part of the stem 22 passes through a gland 30 which provides sealing against the outside when the tap is open. According to another particular feature, the stem has, above the gland 30, a reduced cross-section 32 which forms a safety rupture point. Thus, should the stem break for any reason, the break will always occur at this point, that is to say above the gland 30 which will continue to provide a seal.

The top of the stem 22 is connected to a cylindrical piston 34. This connection may, for example, be provided by a mushroom-shaped top to the rod 22, engaged in a housing of complementary shape in the base of the piston 34.

The tap is operated by an operating handwheel 36 which has or is screwed onto a cylindrical sleeve 38. This sleeve 38 has an external screw thread 40 which interacts with a corresponding internal screw thread 42 in the upper part of the body 10 of the tap. Turning the wheel thus causes vertical translation of the sleeve 38.

The sleeve 38 also has an internal screw thread 44 which interacts with a corresponding external screw thread 46 of the piston 34 which, because of this, undergoes axial translation under the effect of the turning and translational movement of the sleeve 38. The particular feature is that the sets of external threads 40 and 42 and internal threads 44 and 46 cause a differential effect in the axial movements of the sleeve 38 and of the piston 34. If the pitch of the internal screw threads 44, 46 is smaller than the pitch of the external screw threads 40, 42, then a downwards movement of the sleeve 38 under the effect of the wheel 36 being turned in the direction for opening the tap, causes the piston 34 to move upwards, but given that the pitch of its screw thread is smaller than the pitch of the external screw thread, the downwards movement is predominant, but its amplitude as imposed by the pitch of the external screw thread is reduced by the pitch of the internal screw thread. Through a suitable selection of screw pitches, the force needed to operate the wheel in order to open the tap under the pressure of the gas can thus be demultiplied as desired. By contrast, the greater the demultiplication ratio, the more the wheel will need to be turned.

It is also possible for the pitch of the internal screw threads 44, 46 to be greater than those of the external screw threads 40, 42. When this is the case, the arrangement needs to be such that turning the wheel 36 with a view to opening the valve raises the sleeve 38 and causes the piston 34 to travel downwards, in other words it is necessary for the effect of the external screw threads 40, 42 to reduce the effect of the internal screw threads 44, 46.

The first alternative, in which the sleeve 38 has to move downwards upon opening, does, however, deserve preferred status because, as a contribution towards safety, the body 10 of the tap has, at the base of the screw thread 42, a shoulder on which a seal, for example a nylon washer, can be placed, and which provides sealing between the body 10 and the sleeve 38 when the tap is wide open.

The embodiment shown in the FIGURE and described hereinabove is merely one example of the way in which the invention can be embodied. Numerous alternatives are possible, the essential feature being that there should be two differential screw threads so that one can modify the effect of the other. Thus, for example, it is possible to design the sleeve 38 with an internal thread which interacts with an external thread on the tap body. The sleeve would then comprise a cylinder extending axially into the body and having an internal screw thread with which an external screw thread of the piston interacts.

It is also possible for the sleeve 38 to be an integral part of the stem 22. In this case, the set of threads 44 and 46 would then be transferred between the lower end of the stem 22 and the closure member 24. The latter would then have to have an appropriate outline that would prevent it from rotating when the stem 22 turns and would allow it to move axially with respect to the seat 26.

Neither is the invention restricted to taps for gas bottles. It can also be applied to straight-way cocks.

What is claimed is:

1. A gas tap comprising a body with an internal opening and closure member interacting with a sealing seat, an external operating element and a connecting stem for transmitting the movement of the operating element to the opening and closure member wherein the opening and closure member are arranged in such a way as to be held against the sealing seat under the effect of the pressure of the gas, in that the operating element comprises a cylindrical sleeve which has a first screw thread that makes the sleeve move axially when the operating element is turned and in that there is a second screw thread with a different screw pitch so as to alter the effect brought about by the first screw thread, wherein the different screw pitch is selected to selectively reduce the actuating force necessary to initially crack open the closure member against the pressure of the gas that is acting to keep the closure member closed and reduce the effect of the pressure of the gas acting on the closure member.

2. The tap according to claim 1, wherein the cylindrical sleeve has an external screw thread interacting with a corresponding internal screw thread in the body of the tap and an internal screw thread interacting with a corresponding external screw thread of a cylindrical piston to which the upper part of the connecting stem is attached, and in that the internal screw thread and the external screw thread of the cylindrical sleeve have different pitches.

3. The tap according to claim 2 wherein the tap body has, at the base of the said corresponding internal screw thread, an annular shoulder with a seal between the body and the base of the cylindrical sleeve when the latter is in the wide-open position.

4. The tap according to claim 3 wherein the connecting stem passes, in its upper part, through a gland and has, above this, a reduced cross-section that forms a safety rupture point.

5. The tap according to claim 2 wherein the connecting stem passes, in its upper part, through a gland and has, above this, a reduced cross-section that forms a safety rupture point.

6. The tap according to claim 2, wherein the pitch of the internal screw thread of the sleeve is smaller than that of its external screw thread.

7. The tap according to claim 6 wherein the tap body has, at the base of the said corresponding internal screw thread, an annular shoulder with a seal between the body and the base of the cylindrical sleeve when the latter is in the wide-open position.

8. The tap according to claim 7 wherein the connecting stem passes, in its upper part, through a gland and has, above this, a reduced cross-section that forms a safety rupture point.

9. The tap according to claim 6 wherein the connecting stem passes, in its upper part, through a gland and has, above this, a reduced cross-section that forms a safety rupture point.

10. The tap according to claim 2, wherein the pitch of the internal screw thread of the sleeve is greater than that of its external screw thread.

11. The tap according to claim 10 wherein the connecting stem passes, in its upper part, through a gland and has, above this, a reduced cross-section that forms a safety rupture point.

12. The tap according to claim 1 wherein the tap body has, at the base of the said corresponding internal screw thread, an annular shoulder with a seal between the body and the base of the cylindrical sleeve when the latter is in the wide-open position.

13. The tap according to claim 12 wherein the connecting stem passes, in its upper part, through a gland and has, above this, a reduced cross-section that forms a safety rupture point.

14. The tap according to claim 1 wherein the connecting stem passes, in its upper part, through a gland and has, above this, a reduced cross-section that forms a safety rupture point.

* * * * *

UNITED STATES PATENT AND TRADEMARK OFFICE
CERTIFICATE OF CORRECTION

PATENT NO.    : 6,102,367
DATED         : August 15, 2000
INVENTOR(S)   : Jean-Claude Schmitz and Leon Kerger It is certified that error appears in the above-identified patent and that said Letters Patent is hereby corrected as shown below:

Claims 3-14 are incorrectly stated and should be corrected to read as follows:

3. The tap according to Claim 2, wherein the pitch of the internal screw thread of the sleeve is smaller than that of its external screw thread.

4. The tap according to Claim 2, wherein the pitch of the internal screw thread of the sleeve is greater than that of its external screw thread.

5. The tap according to Claim 1 wherein the tap body has, at the base of the said corresponding internal screw thread, an annular shoulder with a seal between the body and the base of the cyclindrical sleeve when the latter is in the wide-open position.

6. The tap according to Claim 2 wherein the tap body has, at the base of the said corresponding internal screw thread, an annualr shoulder with a seal between the body and the base of the cylindrical sleeve when the latter is in the wide-open position.

7. The tap according to Claim 2 wherein the tap body has, at the base of the said corresponding internal screw thread, an annular shoulder with a seal between the body and the base of the cylindrical sleeve when the latter is in the wide-open position.

8. The tap according to Claim 1 wherein the connecting stem passes, in its upper part, through a gland and has, above this, a reduced cross-section that forms a safety rupture point.

9. The tap according to Claim 2 wherein the connecting stem passes, in its upper part, through a gland and has, above this, a reduced cross-section that forms a safety rupture point.

10. The tap according to Claim 3 wherein the connecting stem passes, in its upper part, through a gland and has, above this, a reduced cross-section that forms a safety rupture point.

UNITED STATES PATENT AND TRADEMARK OFFICE
CERTIFICATE OF CORRECTION

PATENT NO. : 6,102,367
DATED : August 15, 2000
INVENTOR(S) : Jean-Claude Schmitz and Leon Kerger It is certified that error appears in the above-identified patent and that said Letters Patent is hereby corrected as shown below:

11. The tap according to Claim 4 wherein the connecting stem passes, in its upper part, through a gland and has, above this, a reduced cross-section that forms a safety rupture point.

12. The tap according to Claim 5 wherein the connecting stem passes, in its upper part, through a gland and has, above this, a reduced cross-section that forms a safety rupture point.

13. The tap according to Claim 6 wherein the connecting stem passes, in its upper part, through a gland and has, above this, a reduced cross-section that forms a safety rupture point.

14. The tap according to Claim 7 wherein the connecting stem passes, in its upper part, through a gland and has, above this, a reduced cross-section that forms a safety rupture point.

Signed and Sealed this

Twenty-fifth Day of September, 2001

*Attest:*

*Nicholas P. Godici*

NICHOLAS P. GODICI
*Acting Director of the United States Patent and Trademark Office*

*Attesting Officer*